(12) United States Patent
Desai

(10) Patent No.: US 8,416,482 B2
(45) Date of Patent: Apr. 9, 2013

(54) MICRO ELECTRO-MECHANICAL SYSTEM (MEMS) BASED HIGH DEFINITION MICRO-PROJECTORS

(75) Inventor: Shahyaan Desai, Ithaca, NY (US)

(73) Assignee: Mezmeriz, Inc., Ithaca, NY (US)

(*) Notice: Subject to any disclaimer, the term of this patent is extended or adjusted under 35 U.S.C. 154(b) by 0 days.

(21) Appl. No.: 12/933,259

(22) PCT Filed: Mar. 16, 2009

(86) PCT No.: PCT/US2009/037261
§ 371 (c)(1),
(2), (4) Date: Sep. 17, 2010

(87) PCT Pub. No.: WO2009/117351
PCT Pub. Date: Sep. 24, 2009

(65) Prior Publication Data
US 2011/0013249 A1  Jan. 20, 2011

Related U.S. Application Data

(60) Provisional application No. 61/037,997, filed on Mar. 19, 2008.

(51) Int. Cl.
*G02B 26/08* (2006.01)
(52) U.S. Cl. .................................................. 359/213.1

(58) Field of Classification Search ............... 359/213.1, 359/214.1, 223.1–226.1, 290, 291
See application file for complete search history.

(56) References Cited

U.S. PATENT DOCUMENTS

| | | | |
|---|---|---|---|
| 7,405,854 B2 | 7/2008 | Desai et al. | |
| 7,457,021 B2 | 11/2008 | Desai | |
| 7,616,367 B2 | 11/2009 | Desai | |
| 7,636,190 B2 * | 12/2009 | Huibers | 359/291 |
| 7,675,698 B2 | 3/2010 | Desai et al. | |
| 7,835,055 B2 | 11/2010 | Desai | |
| 2001/0050758 A1 * | 12/2001 | Suzuki et al. | 353/69 |
| 2010/0025784 A1 | 2/2010 | Desai et al. | |
| 2010/0295414 A1 | 11/2010 | Desai et al. | |

* cited by examiner

*Primary Examiner* — Euncha Cherry
(74) *Attorney, Agent, or Firm* — Choate Hall & Stewart LLP; Brenda Herschbach Jarrell; William R. Haulbrook

(57) ABSTRACT

In one aspect, a system for facilitating short depth projection is shown and described. In brief overview, the system comprises a MEMS scanner that produces a ray of light in communication with an illumination source. An oscillating micromirror receives the ray of light from the illumination source and reflects the ray to one or more points on a curved reflective surface. The micromirror comprises a silicon mirror reinforced by a high-stiffness material. The system further comprises a screen on which the curved reflective surface projects the ray of light received from the micromirror.

20 Claims, 15 Drawing Sheets

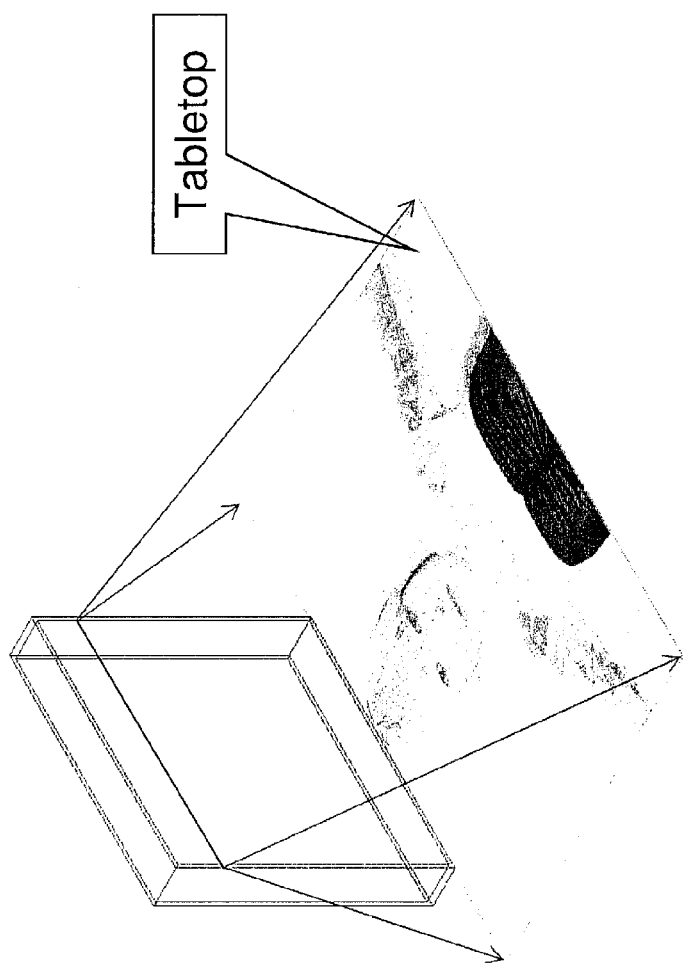

MICRO ELECTRO-MECHANICAL SYSTEM (MEMS) BASED HIGH DEFINITION MICRO-PROJECTORS

RELATED APPLICATIONS

The present disclosure claims priority to and the benefit of co-pending PCT Application No. PCT/US2009/037261, titled "Micro Electro-Mechanical System (MEMS) Based High Definition Micro-Projectors," filed Mar. 16, 2009; and U.S. Provisional Patent Application No. 61/037,997, titled "Micro Electro-Mechanical System (MEMS) Based High Definition Micro-Projectors," filed Mar. 19, 2008, each of which are incorporated by reference in their entirety.

FIELD OF THE INVENTION

The present disclosure relates to laser scanning displays. In particular, the present disclosure relates to systems and methods for producing and operating laser displays having large display areas and short depth image projection using a laser scanner. The present disclosure also relates to systems for reinforcing oscillating mirrors employed in optical scanners in display systems.

BACKGROUND OF THE INVENTION

Using laser optoelectronics to project video and images is a new display technology. Although the idea of using laser diodes for displays has been discussed for a long time, prohibitive cost and safety issues prevented the development of laser televisions and projectors.

Further, because laser displays are of a rear-projection type, laser displays require a large distance between the projector and the screen. The required distance between the projector and screen increases as the size of the screen in increased. This renders the depth of laser TVs and displays larger than that of LCD or plasma TVs and displays of competing size.

Micro-electro-mechanical systems (MEMS) are used for fabricating scanning systems in optical display devices such as TVs and projectors. With the increase in image resolution, projection and display technologies are also advancing. For example, the high definition TV standard requires displays and projectors having a much higher scanning speed than that for standard definition.

However, existing MEMS projectors are not suitable for high definition image and video projection. High definition MEMS projectors require very fast moving micromirrors which are not energy efficient.

Additionally, most MEMS devices are made from silicon, which tend to break when subjected to rapid oscillations. These devices are at least deformed to a large extent during operation resulting in optical aberrations and unsatisfactory projection quality for high definition projection. Therefore, there is a need to strengthen silicon devices for them to withstand the operating mode for high definition projection.

BRIEF SUMMARY OF THE INVENTION

In one aspect, a system for facilitating short depth projection is shown and described. In brief overview, the system comprises a MEMS scanner that produces a ray of light in communication with an illumination source. An oscillating micromirror receives the ray of light from the illumination source and reflects the ray to one or more points on a curved reflective surface. The micromirror may include a silicon mirror reinforced by a high-stiffness material. The system further comprises a screen on which the curved reflective surface projects the ray of light received from the micromirror.

In one embodiment, the illumination source is a laser source. In another embodiment, the micromirror is reinforced by ribs made from the high stiffness material. In still another embodiment, the micromirror is reinforced by one or more layers of the high stiffness material coupled to the micromirror in an arrangement of a plurality of polygonal units. In other embodiments, the micromirror is reinforced by one or more layers of the high stiffness material coupled to the micromirror in an arrangement of a plurality of lattice structures or corrugations.

In some embodiments, the screen maybe a diffused screen or a graded index screen. In one embodiment, the system comprises an arrangement of shaping optics traversed by the ray of light. In another embodiment, the system comprises a layer of piezo-electric material coupled to the micromirror. The piezo-electric layer receives an electrical signal at the same frequency as the oscillating mirror. In still another embodiment, when the mirror warps due to inertial forces from high speed bending, the voltage applied across the piezo film results in the film bending in the opposite direction to the warping of the mirror in effect flattening the mirror out.

In another aspect, a method for facilitating short depth projection is shown and described. The method includes producing a ray of light by an illumination source in communication with a micro-electro-mechanical system. The produced ray of light is reflected by an oscillating micromirror over an angular range. In one embodiment, the oscillating micromirror comprises a silicon mirror reinforced by a high stiffness material. The reflected ray of light is further projected onto a screen from one or more points on a curved reflective surface.

In one embodiment, the producing of the ray of light is done using a laser source. In another embodiment, the method includes changing a direction of the ray of light by an arrangement of shaping optics between the illumination source and the micromirror.

In yet another aspect, a system for reducing optical aberrations in short depth projection is shown and described. In brief overview, the system includes a micromirror oscillating about a pivot point. The micromirror receives a ray of light originating from an illumination source in communication with a micro electro-mechanical system. The system further includes a layer of piezo-electric material coupled to the micromirror. When an electrical signal is applied across the piezo-electric layer, the piezo-electric layer bends in a direction opposite to the bending of the mirror to oppose the force due to the bending of the micromirror.

In one embodiment, the illumination source in the system comprises a laser source. In another embodiment, the micromirror is reinforced by ribs made from the high stiffness material. In still another embodiment, the micromirror is reinforced by one or more layers of the high stiffness material coupled to the micromirror in an arrangement of a plurality of polygonal units. In yet other embodiments, the micromirror is reinforced by one or more layers of the high stiffness material coupled to the micromirror in an arrangement of a plurality of lattice structures or corrugations. In one embodiment, the system further comprises an arrangement of shaping optics traversed by the ray of light.

In another aspect a portable device comprising a micro electro mechanical system (MEMS) based micro projector is shown and described. In one embodiment, the portable device delivers high definition video. In another embodiment, the device projects images and/or video from a ultra-close projection distance. In another embodiment, the device enables viewing in bright daylight. In one embodiment, the device functions for at least 2.5 hours on a single charge. In another embodiment, the device is priced at less than $200. In some embodiments, the device may be used in a plurality of gadgets including but not limited to personal projectors, memory stick all-in-one presentation tools, lightweight laptops, high definition televisions, laser printers, cameras and 3 dimensional displays.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 10A-10C are diagrams depicting example operations of micro projectors.

DETAILED DESCRIPTION OF THE INVENTION

Figure 1:
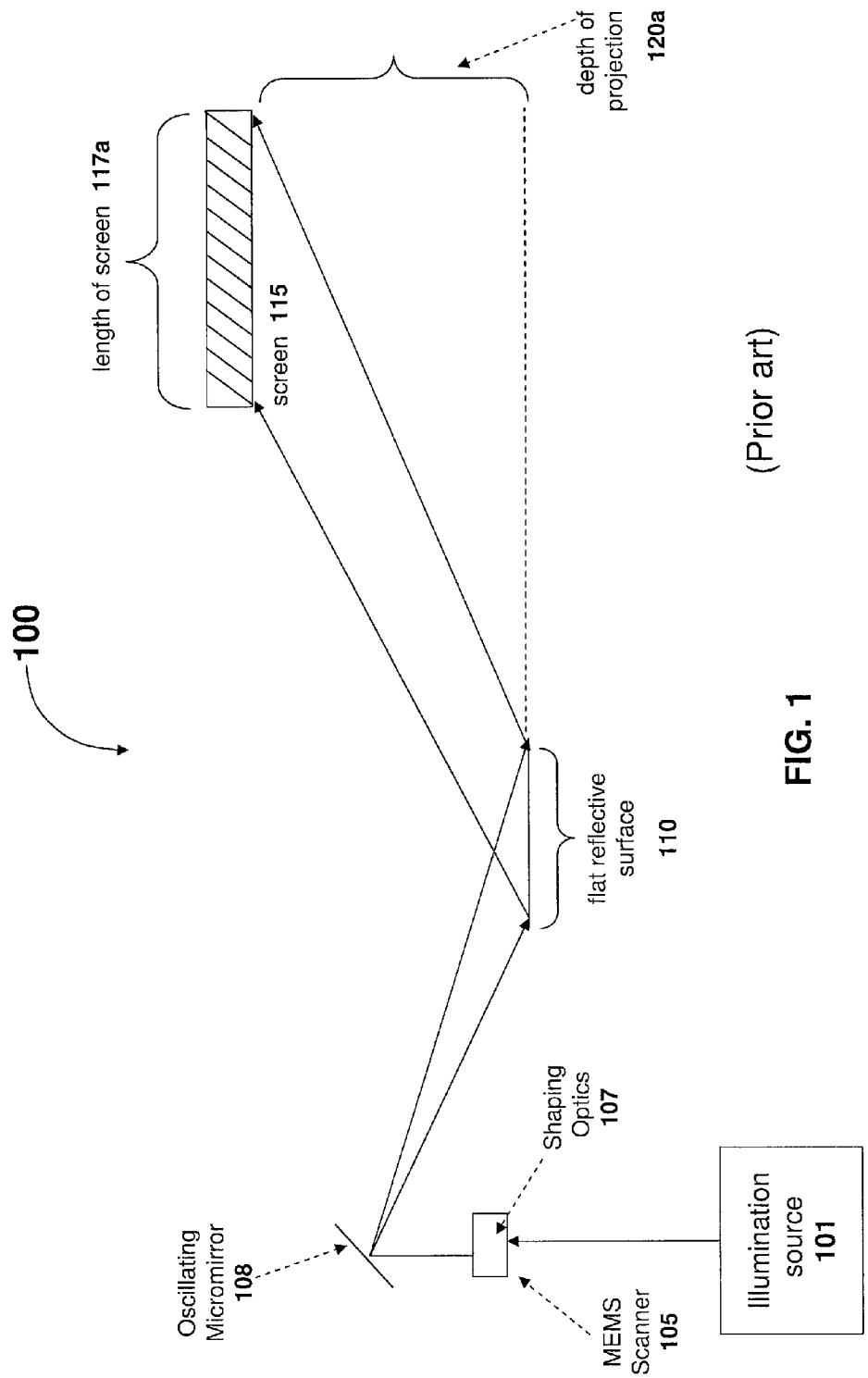
FIG. 1 is a block diagram of a system for projecting images and video using a MEMS scanner.

Referring to FIG. 1, a block diagram of a system 100 for projecting images and video using a MEMS scanner is depicted. In brief overview, the system comprises an illumination source 101, a MEMS scanner 105 and a projection mechanism 110. The MEMS scanner further comprises an oscillating micromirror 108 and an ensemble of shaping optics 107.

The illumination source 101 produces one or more light rays 103 to be projected on a screen or display unit. In one embodiment, the illumination source 101 is a laser source. In another embodiment, the illumination source 101 is one or more Light Emitting Diodes (LED). In still another embodiment, the illumination source 101 is phosphors excited by plasma. In yet other embodiments, the illumination source 101 may be one of a surface-conduction electron emitter, a cathode ray tube (CRT) and an organic light emitting diode (OLED). In still other embodiments, the illumination source 101 may be any other source of radiation as apparent to one skilled in the art.

The light ray 103 produced by the illumination source 101 is transmitted to the MEMS scanner 105. In one embodiment, the light ray 103 comprises electromagnetic radiation of one or more wavelengths. In another embodiment, the light ray 103 lies within the spectrum visible to human eye. In still another embodiment, the light ray 103 lies in the ultra violet (UV) region of the spectrum. In yet another embodiment, the light ray 103 lies in the infrared (IR) region of the spectrum. In one embodiment, the light ray 103 is a ray emanating from a laser source.

The MEMS scanner 105 receives the light ray 103 produced by the illumination source and transmits the light ray to the projection mechanism 110. In some embodiments, the MEMS scanner comprises an ensemble of shaping optics 107. In one of these embodiments, the shaping optics 107 may include one or more optical lenses. In another of these embodiments, the shaping optics 107 includes optical filters. In still another embodiment, the shaping optics 107 may include a polarizer. In yet other embodiments, the shaping optics may include one or more of a multiplexer, reflector, prism and any other means for processing a light ray as apparent to one skilled in the art. In one embodiment, the shaping optics 107 may be an active ensemble powered by a power source. In another embodiment, the shaping optics 107 is a passive ensemble.

The oscillating micromirror 108 receives light processed by the shaping optics 107 and reflects the light ray to the projection mechanism 110. In one embodiment, the micromirror 108 is fabricated from monocrystalline silicon. In another embodiment, polycrystalline silicon is used to fabricate the micromirror 108. In still another embodiment, the micromirror may be fabricated from a silicon on insulator (SOI) substrate. In one embodiment, the micromirror is activated by an actuator such as a piezo-electric actuator. In another embodiment, the micromirror 108 may be activated by other power sources as apparent to one skilled in the art. In one embodiment, the micromirror 108 is mounted on a torsion bar that rotates to cause the micromirror 108 to oscillate. In another embodiment, the micromirror 108 is mounted on a cantilever.

The dimension of the micromirror 108 determines the minimum obtainable pixel size for a projected image. On the other hand, the number of pixels in a given direction of the projected image is proportional to a vibration angle of the micro mirror 108. Therefore, for projecting a large number of pixels, the micromirror 108 may scan a large angular range very rapidly. Some embodiments of the present disclosure address these design issues of the micromirror 108. The micromirror 108 is described in more details with reference to FIGS. 4-7.

Figure 2:
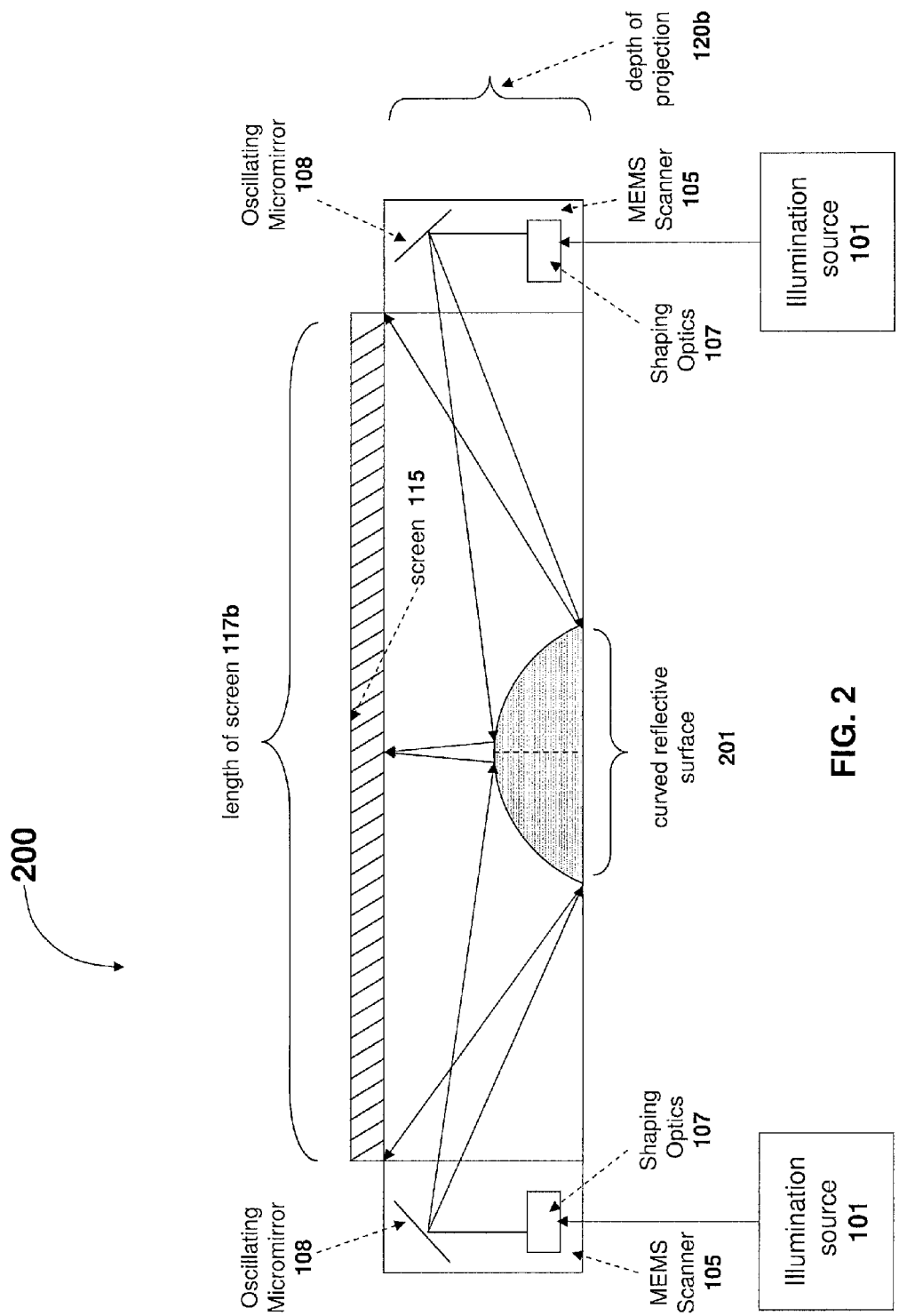
FIG. 2 is a cross sectional view of an embodiment of a short depth projection system.

Referring now to FIG. 2, an embodiment of a short depth projection system is shown and described. The system includes one or more MEMS scanner 105 comprising of the shaping optics 107 and the oscillating micromirror 108. Furthermore, the system includes a curved reflective surface 201 and a screen 205 where the image or video is projected.

In one embodiment, the curved reflective surface 201 is a cylindrical mirror. In another embodiment, the curved reflective surface 201 is a spherical mirror. In still other embodiments, the reflective surface 201 may be other curved solid surfaces. The light ray from the reflective surface is projected onto the screen 205. In one embodiment, the screen 205 is a diffused screen. In another embodiment, the screen 205 is a graded index screen.

Figure 3:
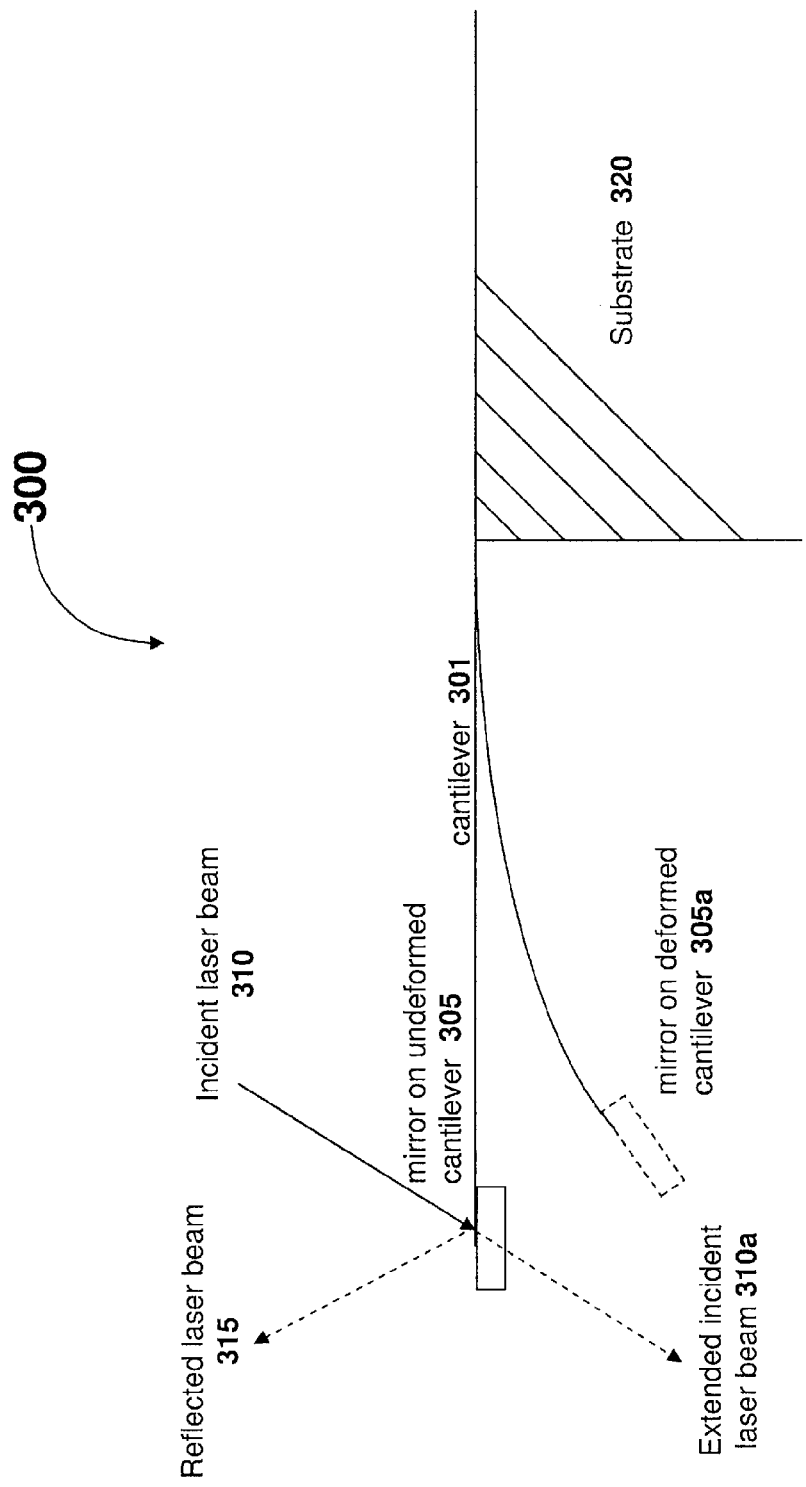
FIG. 3 is a diagram depicting a conventional oscillating mirror.

Referring now to FIG. 3, a conventional oscillating mirror system 300 in a MEMS scanner is described. A micromirror 305 is fabricated on a cantilever 301 extending from a substrate 320. In an undeformed state of the cantilever 301, an incident laser beam 310 strikes the mirror 305 and a reflected laser beam 315 is transmitted towards a reflective surface 201' (not shown). During the oscillation of the micromirror 305, the deformed cantilever 301a may render the micromirror in a position 305a. Under these circumstances, the extended incident laser beam 310a fails to strike the mirror 305a as illustrated in FIG. 3. Therefore, conventional oscillating mirrors cannot be used throughout their entire scan capability. Furthermore, such conventional mirror systems 300 also suffer from problems of "beam-walking." During "beam-walking," since the incident laser beam position is fixed, the incident laser beam 310 traverses along the axis of deformation across the face of the mirror as the cantilever deflects. This results in the mirror causing distortions in the scan.

Figure 4:
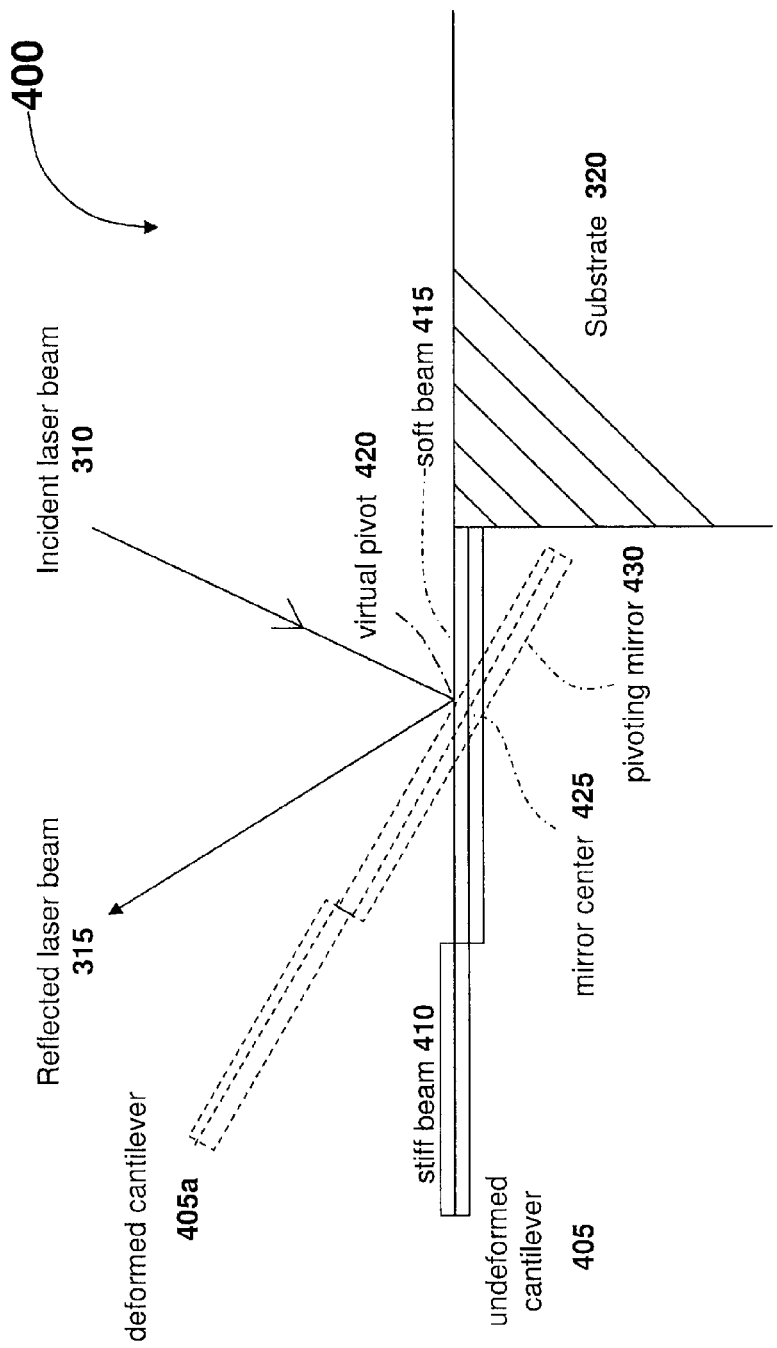
FIG. 4 is a diagram depicting a profile view of an embodiment of an oscillating mirror.

FIG. 4 depicts a profile view of an oscillating micromirror system 400 to overcome the problems of a conventional oscillating mirror system described with reference to FIG. 300. The cantilever 405 of system 400 comprises a stiff beam portion 410 and a soft beam portion 415. In one embodiment, the mirror is attached to the entire cantilever 405. In other embodiments, the mirror is attached to the stiff beam 410 of the cantilever 405. In one embodiment, the cantilever oscillates in a way such that mirror center 425 of the oscillating mirror 430 coincides with the virtual pivot 420 of the oscillations in the profile view as depicted in FIG. 4. In another embodiment, the virtual pivot 420 does not move with the deflection of the cantilever 405. In one embodiment, when the cantilever is in its extreme deformed position 405a, the incident laser beam 310 still strikes the mirror surface and the reflected laser beam 315 is transmitted to the reflective surface 201. In one embodiment, the virtual pivot point 420 in the cantilever system 400 can be controlled by varying the lengths of the soft beam 415 and stiff beam 410 making up the cantilever 405. In another embodiment, the virtual pivot 420 is located at ⅓ of the length of the soft beam 415. The cantilever system 400 is capable of large deflections and scan angles without the drawbacks of conventional oscillating micromirrors as described with reference to FIG. 3.

Figure 5:
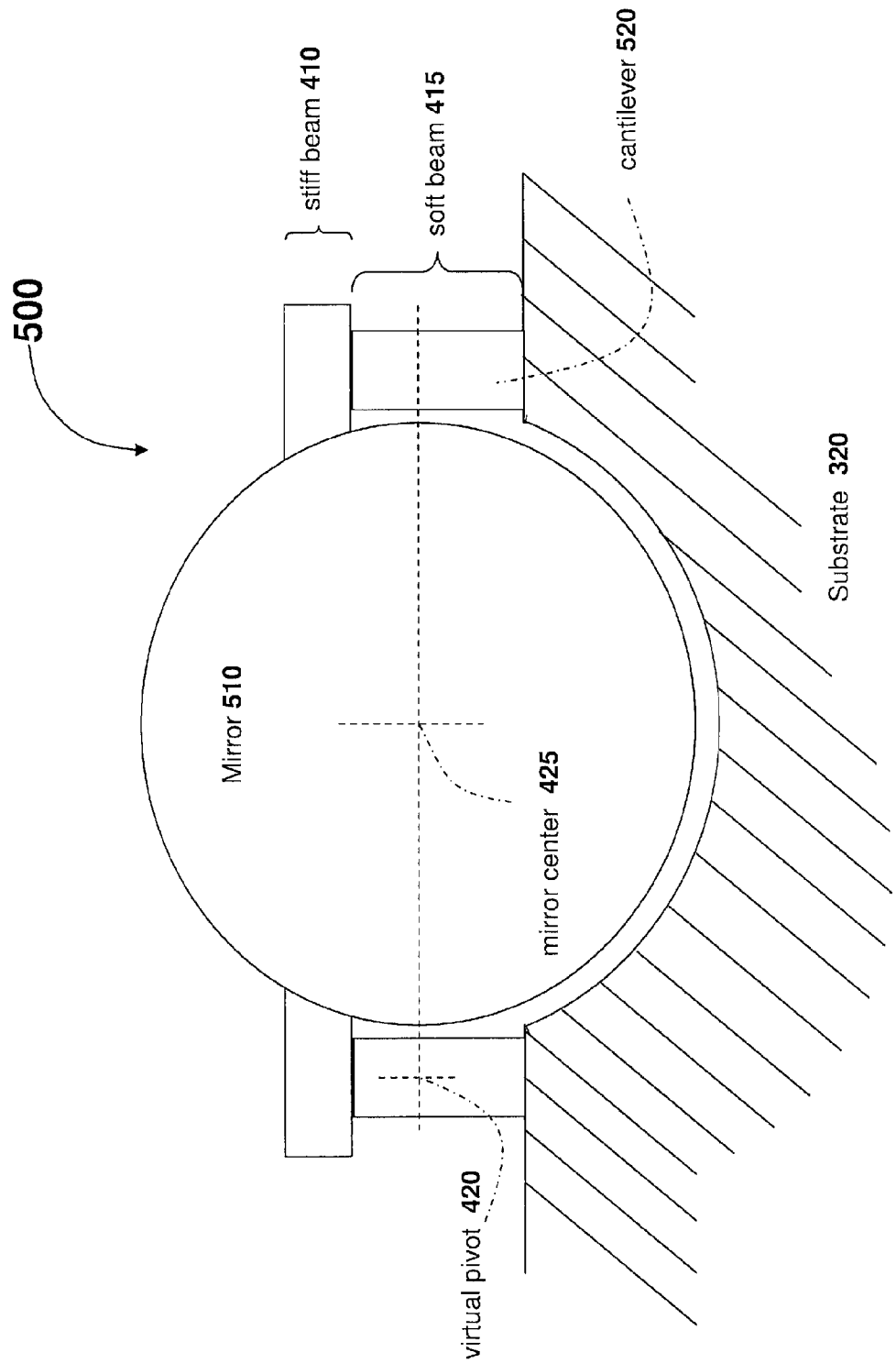
FIG. 5 is a diagram depicting a top view of an embodiment of an oscillating mirror.

Referring now to FIG. 5, a top view of the system 400 is depicted. In one embodiment, the oscillating mirror 430 is attached to the stiff beam 410 of the cantilever 405. The shape of the oscillating mirror 430 may be designed as suited for a particular application. In one embodiment, the oscillating mirror 430 is circular. In another embodiment, the oscillating mirror 430 may be one of a square, a rectangle and any other shape as suited for an application. In one embodiment, the mirror center 425 and the virtual pivot 420 fall along the same line as depicted in FIG. 5. In another embodiment, the oscillating mirror is not directly connected to the substrate 320. In still another embodiment, the oscillating mirror is strengthened by reinforcements such as any reinforcements described in connection with FIG. 6.

Figure 6:
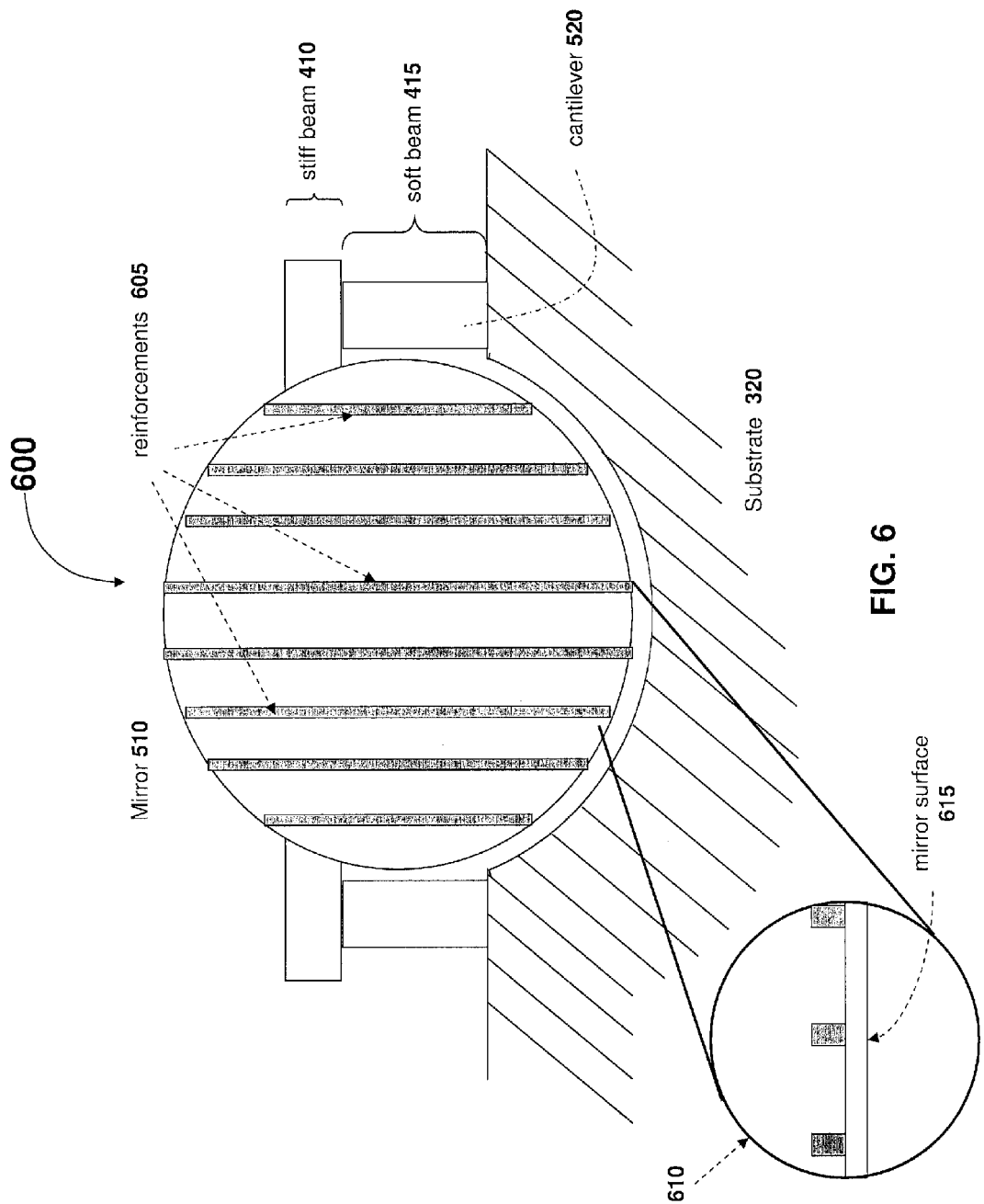
FIG. 6 is a diagram depicting reinforcements used in an oscillating mirror.

FIG. 6 depicts an embodiment of the system 400 with reinforcements 605 coupled to the oscillating mirror. Mirrors that pivot at high speeds to scan a beam of light are subject to deformations arising from large inertial forces from angular acceleration. In one embodiment, thick and strong mirror structures may be used to mitigate these deformations. However, using thick mirror structures results in reduced scan speeds and/or higher power consumption. In another embodiment, the micromirror 430 is strengthened by using reinforcements 605 made from one or more high stiffness materials. In one embodiment, the reinforcements 605 are arranged in a formation of parallel ribs on the non-reflecting side of the mirror 430. FIG. 6 also depicts a blown up part 610 of the mirror profile showing the arrangement of the reinforcements 605. In another embodiment, the reinforcement 605 is coupled to the mirror 430 as a layer of the high stiffness material arranged in units of polygons such as hexagons. In still another embodiment, the reinforcement 605 is coupled to the mirror 430 as a layer of the high stiffness material arranged in units of a lattice structure. In yet another embodiment, the reinforcements 605 are arranged in a formation of high stiffness corrugations on the mirror 430. In one embodiment, the corrugations include hollow channels in their structure.

In some embodiments, structures of carbon such as diamond are used as the high stiffness material. In one of these embodiments, ultra nanocrystalline diamond (UNCD) is used to fabricate the reinforcements 605. In one embodiment, chemical vapor deposition (CVD) techniques are used in depositing the high stiffness material on the micromirror 430. In other embodiments, the reinforcements 605 are fabricated using high stiffness carbon fibers and/or carbon nanotubes. In one of these embodiments, the carbon fiber and/or nanotubes are embedded within a polymer matrix. In another of these embodiments, the fibers and/or nanotubes are placed into slots patterned into the back of the mirror structure. In one embodiment, the carbon fibers and/or nanotubes are embedded or encapsulated in the polymer matrix by spin and spray coating methods. In another embodiment, the carbon fibers and/or nanotubes are embedded or encapsulated in a ceramic matrix CVD methods. In still another embodiment, the carbon fibers and/or nanotubes are embedded or encapsulated in a metal matrix by electro deposition or CVD methods. In yet other embodiments, the reinforcements 605 may be fabricated from other materials using any other techniques as apparent to one skilled in the art.

Figure 7:
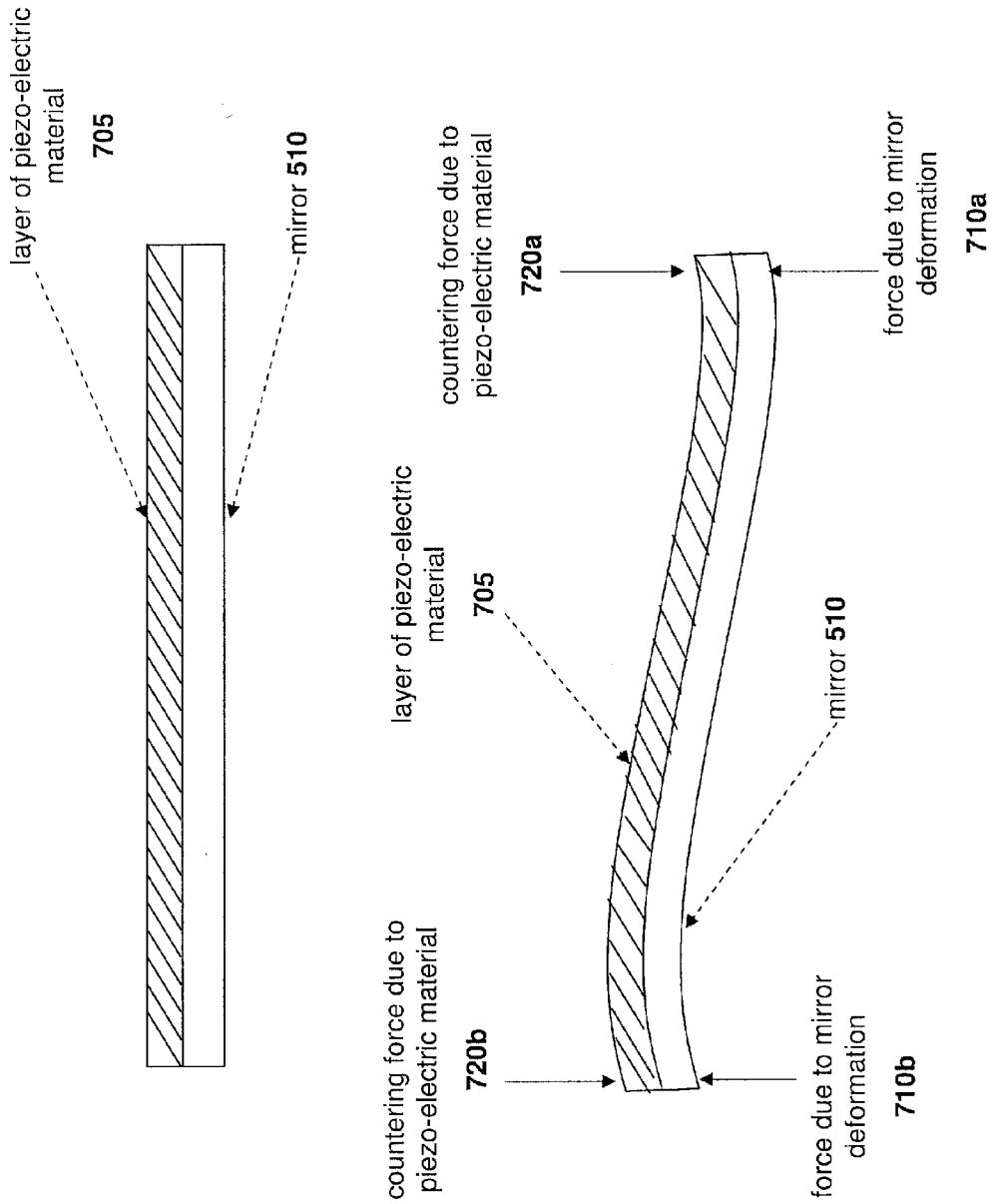
FIG. 7 is a pair of diagrams showing a micromirror with a layer of piezo-electric material in undeformed and deformed states, respectively.

FIG. 7 depicts a profile view of the micromirror 403 with a layer of piezo-electric material 705 in both an undeformed 430 and a deformed 430a state. Piezo-electric materials refer to the class of materials that generate an electric potential under an application of mechanical stress. In some embodiments, the piezo-electric material used in forming the layer 705 is composed of a naturally occurring piezo-electric crystal such as berlinite, quartz, apatite, rochelle salt or topaz. In other embodiments, the piezo-electric material used is a man-made crystal such as gallium orthophosphate or langasite. In yet other embodiments, the piezo-electric material is a man made ceramic such as barium titanate, lead titanate, lead zirconate titanate, potassium niobate, lithium niobate, sodium tungstate or lithium tantalate. In still another embodiment, polymers such as polyvinylidene fluoride (PVDF) is used as a piezo-electric material. In some embodiments, a combination of natural and man made piezo-electric materials is used in forming the layer 705.

In some embodiments, the rapid oscillations of the micromirror 430 causes the mirror 430 to warp or deform. When the micromirror is in a deformed state 430a, mechanical forces 710a, 710b (710 in general) develop in one or more parts of the micromirror 430. In one embodiment, the developed forces 710 induce mechanical stress on the layer of piezo-electric material 705 which in turn generates an electrical voltage. In another embodiment, the generated electrical voltage is applied across an electromechanical circuit 730 (not shown). In still another embodiment, the electromechanical circuit 730 converts the voltage across it to a force 740 (not shown). In yet another embodiment, one or more components 720a, 720b (720 in general) of the force 740 acts on the micromirror 430 in a direction opposite to the forces 710. In one embodiment, the forces 720 at least partially negates the warping or deformation of the micromirror 430.

In some embodiments, the layer of piezo electric material 705 is used for generating converse piezo electric effect. In one of these embodiments, an electrical signal is applied across the layer of piezo electric material 705 to bend the layer in an opposite direction to the deformation of the mirror. The bending of the layer in the opposite direction to that of the mirror develops the force 740 (not shown). In one embodiment, one or more components 720a, 720b (720 in general) of the force 740 acts on the micromirror 430 in a direction opposite to the forces 710. In one embodiment, the forces 720 at least partially negates the warping or deformation of the micromirror 430.

Figure 8:
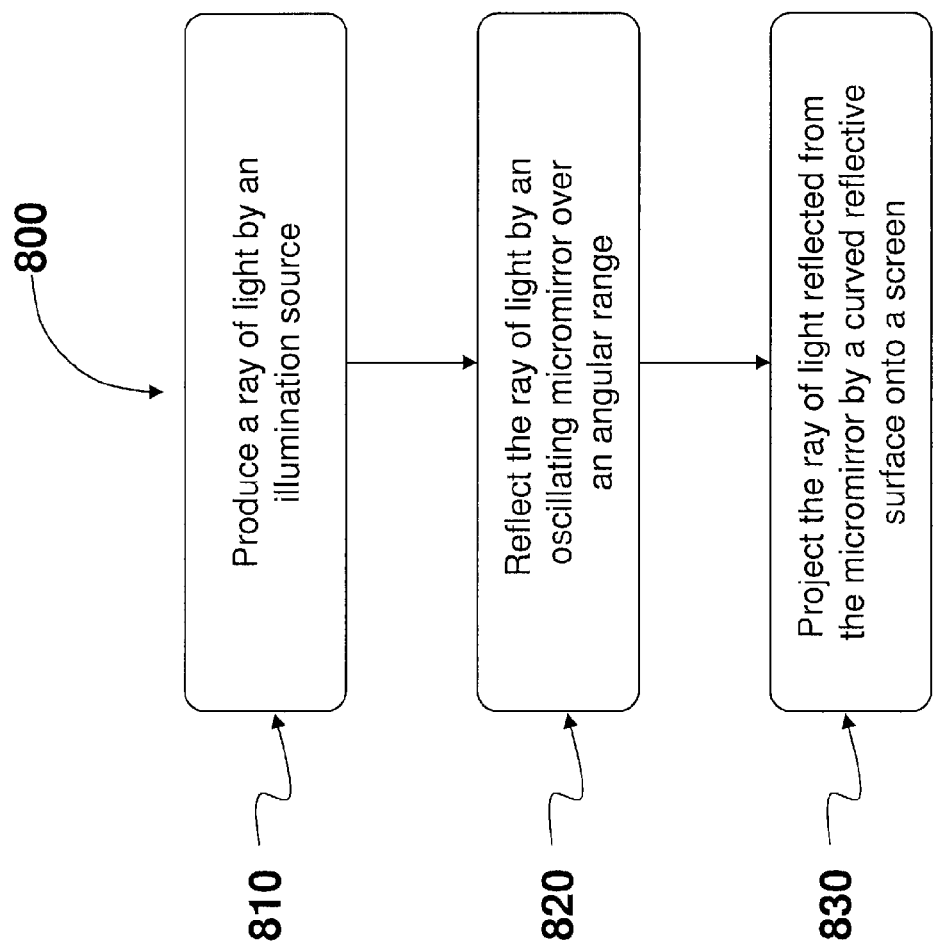
FIG. 8 is a flow diagram depicting the steps taken in an embodiment of a method to facilitate short depth projection.

FIG. 8 depicts an embodiment of steps taken in a method for facilitating short depth projection. The method includes producing (step 810) a ray of light by an illumination source, reflecting (step 820) the ray of light by an oscillating micromirror over an angular range and projecting (step 830) the ray of light reflected by the micromirror onto a screen by a curved reflective surface.

In one embodiment, the illumination source producing (step 810) the ray of light is a light emitting diode. In another embodiment, the ray of light is produced by a laser source. In one embodiment, the laser source produces a continuous wave (CW) laser. In another embodiment, the laser source produces pulsed laser. In one embodiment, the laser source produces gas lasers using gases such as carbon dioxide, helium, neon and argon. In another embodiment, the laser is produced due to chemical reactions involving excited dimers or excimers such as Fluorine ($F_2$) and noble gas compounds. In still another embodiment, the laser is produced using solid state laser materials made by doping crystalline solids with ions providing required energy states. In some embodiments, the laser is produced from semiconductor laser diodes such as Vertical Cavity Surface-Emitting Laser (VCSEL) and Quantum cascade laser. In still other embodiments, the produced laser is one of a plurality of possible types including but not limited to dye lasers, free electron lasers and chemical lasers.

In one embodiment, the ray of light is transmitted from the illumination source 101 towards the oscillating micromirror in the MEMS scanner 105 through an ensemble of shaping optics 107. In another embodiment, the ray of light is transmitted from the light source 101 to the MEMS scanner 105 over a conduction medium. In one embodiment, the conduction medium is one of a liquid, gas, solid or vacuum. In another embodiment, the conduction medium includes optical fibers.

The ray of light produced by the source 101 is reflected (step 820) by the oscillating micromirror 430 in the MEMS scanner 105 over an angular range. In one embodiment, the mirror 430 is oscillated by applying an electrical signal to oscillate the cantilever 405 housing the mirror. In another embodiment, the frequency of the applied electrical signal equals the resonant frequency of the micromirror 430.

In one embodiment, the ray of light is reflected (step 820) over the angular range due to the oscillation of the micromirror. In another embodiment, the oscillation of the micromirror 430 are triggered by an electromechanical circuit. In still another embodiment, the electromechanical circuit uses piezo-electric actuators to trigger the oscillations of the micromirror 430. In yet another embodiment, one or more pairs of electrodes control the oscillations of the micromirror 430. In one embodiment, the cantilever 405 is triggered to oscillations in order to oscillate the micromirror 430 mounted on the cantilever 405.

The ray of light from the oscillating micromirror 430 is projected (step 830) on a screen 205 by a curved reflective surface 201. In one embodiment, the use of the curved reflective surface 201 enables short depth projection with low power consumption and limited dimensions of the reflective surface 201.

Figure 9A:
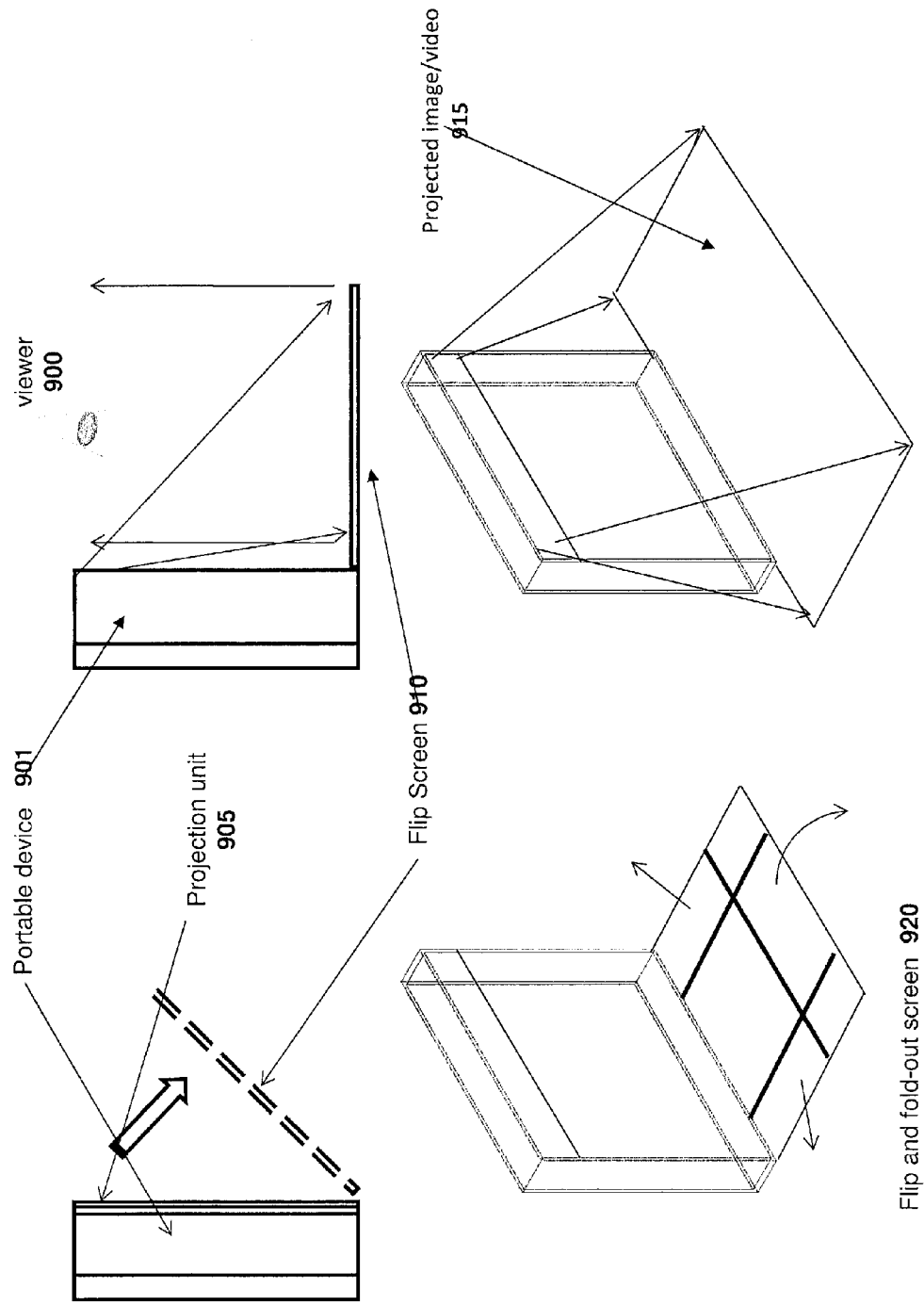
FIG. 9A-9D are diagrams depicting different modes of usage of a short depth micro projector.
Figure 9B:
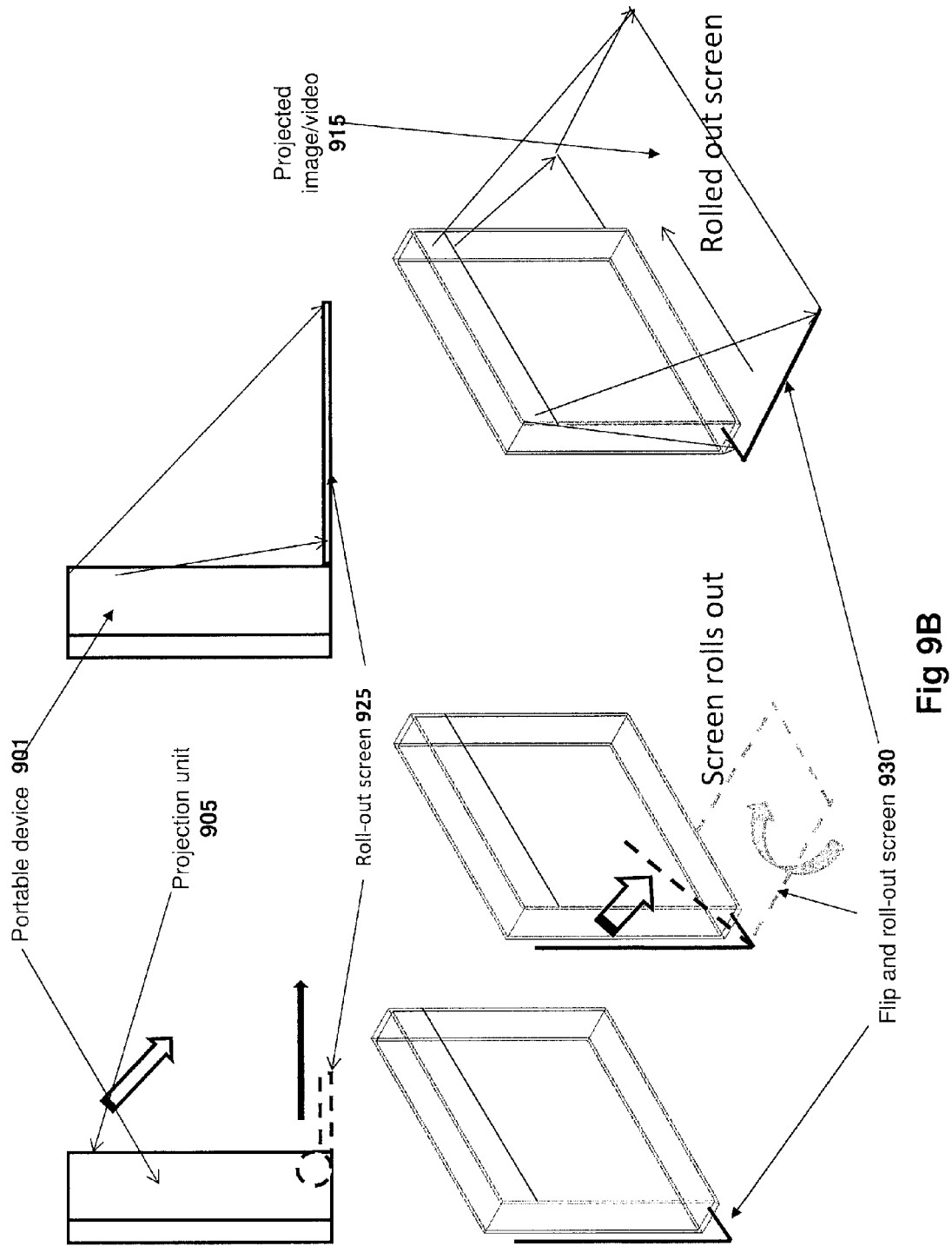

Referring now to FIG. 9A-9B, different embodiments of a short depth micro projector are shown. In one embodiment, the micro projector may be constructed as a portable device 901. In one embodiment, the portable device 901 may be a mobile phone. In another embodiment, the portable device 901 may be a Personal Digital Assistant (PDA). In still other embodiments, the portable device 901 may include other portable gadgets including but not limited to a GPS device, a mobile internet device, a portable audio/video player, a laptop and an ultra-mobile computer. In some embodiments, the portable device 901 includes a projection unit 905.

The portable device 901 may include a screen for projecting images and/or video 915. In one embodiment, the screen is a flip screen 910 as depicted in FIG. 9A. In another embodiment, the screen is a flip and fold-out screen 920. In still another embodiment, the screen is a roll out screen 925 as depicted in FIG. 9B. In yet another embodiment, the screen is a flip and roll-out screen 930. In still other embodiments, the screen may be incorporated into the portable device 901 in a plurality of other ways as apparent to one skilled in the art. In one embodiment, the portable device 901 may use an external screen for projection. In another embodiment, the portable device 901 may use any other surface for projecting image and/or video 915.

In one embodiment, the screen itself is a passive component of the system unlike conventional LCD screens. In another embodiment, an ultra-short throw MEMS scanned beam projection system designed for off-axis projection onto the screen produces the images for interaction with the portable device 901. In still another embodiment, the screen may be specially designed to facilitate off-axis projection. In yet another embodiment, the screen may be comprised of micro-textured surfaces that are designed to redirect the projected light towards the viewer 900. In one embodiment, the screen may be comprised of columns of partially mirrored surfaces with a gradient in the tilt of the columns to redirect incident scanned light towards. In another embodiment, the screen may be a free-form curved mirror like surface designed to re-direct the light from the scanned image towards the viewer 900.

Figure 9C:
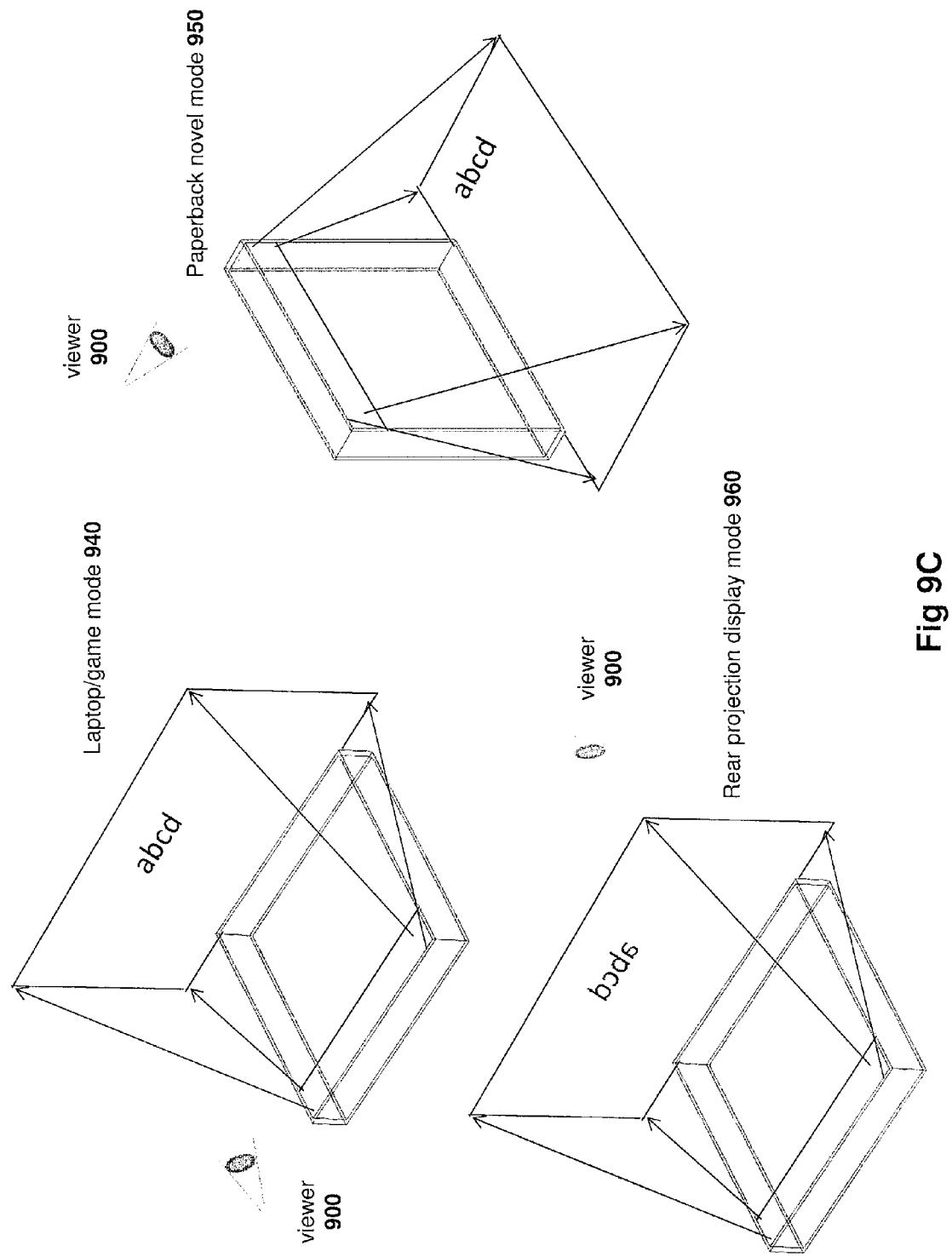
Figure 9D:
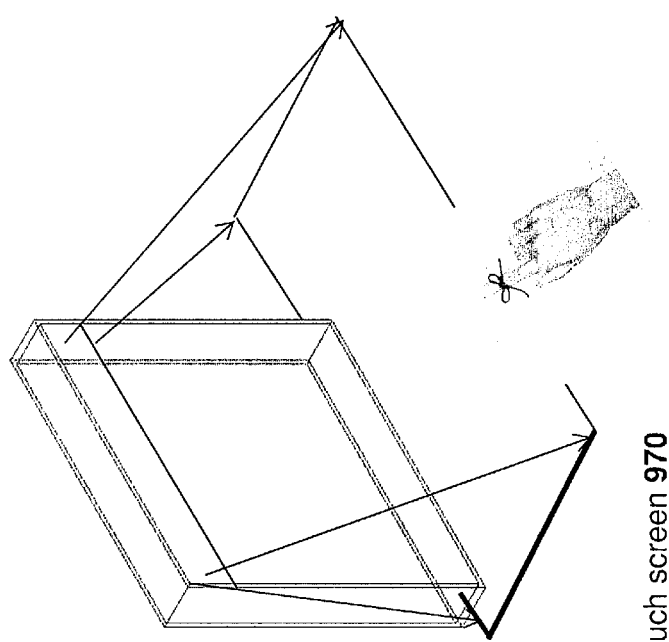
Figure 10A:
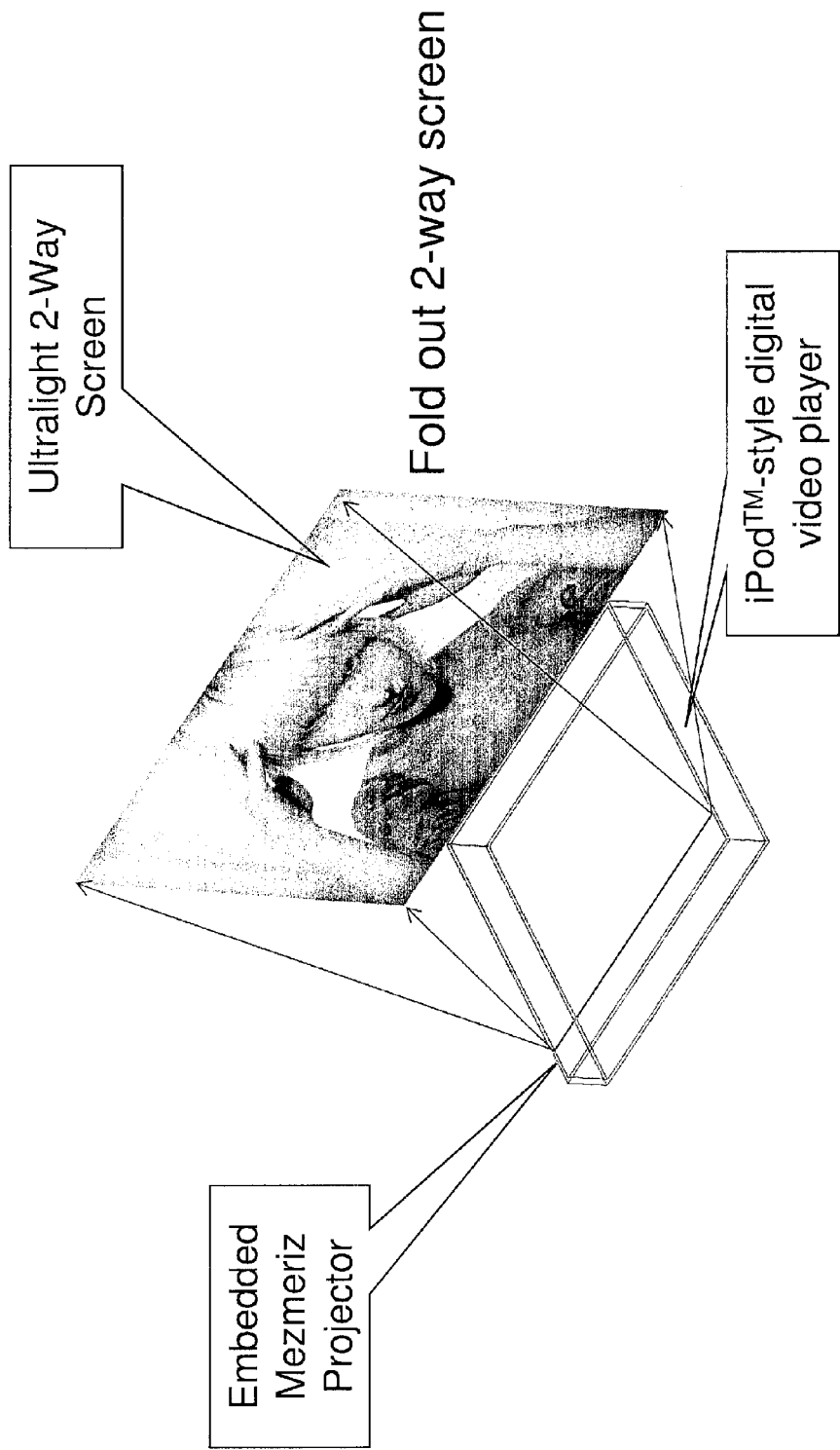
Figure 10B:
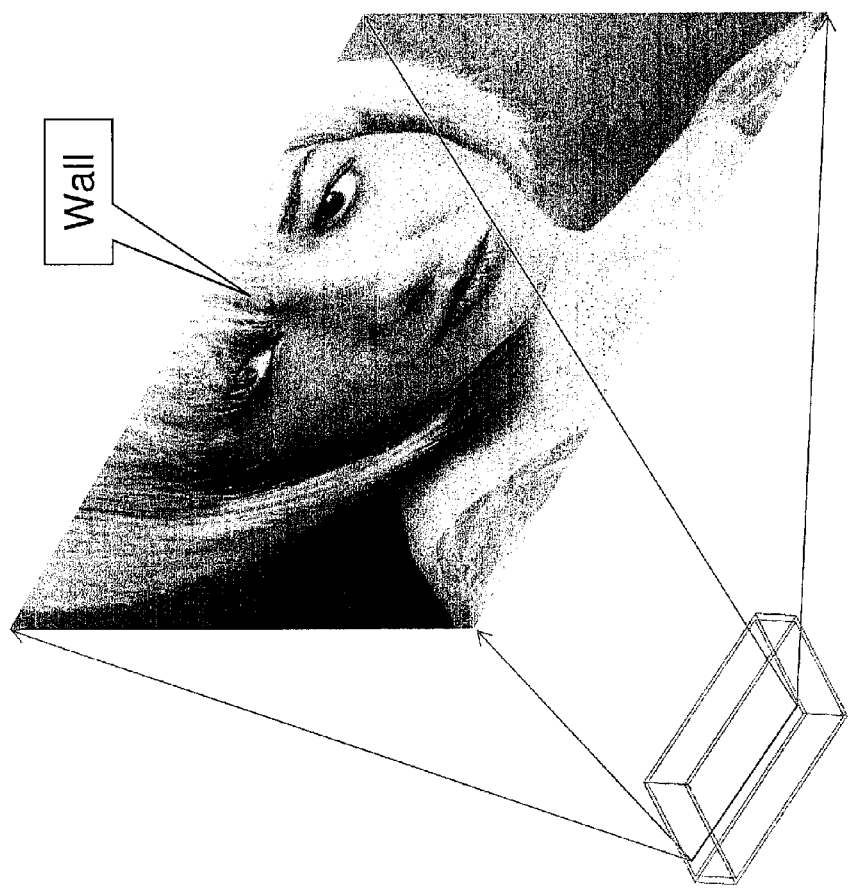

Referring now to FIGS. 9C and 9D different modes of projection using the portable device 901 are shown. In one embodiment, the system is held in hands of a viewer 900 with the roll-out screen held in a 'scroll-like' manner similar to a sheet of paper text. In this embodiment, images and/or video may be viewed in wide-screen format. In another embodiment, the portable device 901 may be operated in a paperback novel mode by rotating the device such that the screen is positioned like the page of a book. This embodiment can be used for a length-wise scroll, view text information, or browse the internet. In still another embodiment, the device 901 may also be used in a laptop/game mode 940. In yet another embodiment, the device 901 may be used in a rear projection mode 960.

In some embodiments, the system may also be fitted with position sensing structures such as accelerometers and gyroscopes that act as sensors within the projection apparatus so as to orient the projected image in different configurations based on how the portable device 901 is placed or held. In other embodiments, the system may also be equipped with a camera parfocal with the scanned beam off-axis projection system. Images from this camera can be used with user-interface software to enable an optical touch-screen 970 for interaction of a user with the system.

Having described certain embodiments of methods and systems for facilitating short depth projection using a MEMS scanner, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A system for facilitating short depth projection, comprising:
   a micro electro-mechanical system (MEMS) scanner in communication with an illumination source, wherein the MEMS scanner is configured to produce a ray of light;
   an oscillating micro mirror comprising a silicon mirror reinforced by a high stiffness material; wherein
      the oscillating micro mirror is configured to reflect the ray of light received from the illumination source to one or more points on a curved reflective surface, and
      the curved reflective surface is configured to project the ray of light received from the micro mirror onto a screen.

2. The system of claim 1, wherein the illumination source is a source of laser.

3. The system of claim 1, wherein the oscillating micro mirror is reinforced by reinforcing ribs made from the high stiffness material.

4. The system of claim 1, wherein the oscillating micro mirror is reinforced by one or more layers of the high stiffness material coupled to the micro mirror in an arrangement of a plurality of polygonal units.

5. The system of claim 1, wherein the oscillating micro mirror is reinforced by one or more corrugated layers of the high stiffness material coupled to the micro mirror.

6. The system of claim 1, wherein the oscillating micro mirror is reinforced by one or more layers of the high stiffness material coupled to the micro mirror in an arrangement of a plurality of lattice structures.

7. The system of claim 1, wherein the screen is one of a diffused screen or a graded index screen.

8. The system of claim 1 further comprising an arrangement of shaping optics traversed by the ray of light.

9. The system of claim 1 further comprising a layer of piezo-electric material coupled to the micro mirror, wherein the layer of piezo-electric material is configured to produce an electrical signal responsive to a first force produced by bending of the micro mirror.

10. The system of claim 9, further comprising an electro mechanical circuit configured to convert the electrical signal to produce a second force in an opposite direction to the first force.

11. A method to facilitate short depth projection, the method comprising:
   (a) producing, by an illumination source in communication with a micro electromechanical system, a ray of light;
   (b) reflecting, by an oscillating micro mirror comprising a silicon mirror reinforced by a high stiffness material, the ray of light over a predetermined angular range; and
   (c) projecting, by a curved reflective surface, the ray of light onto a screen responsive to receiving the ray of light from the micro mirror at one or more points on the curved reflective surface.

12. The method of claim 11 wherein step (a) comprises producing the ray of light using a laser source.

13. The method of claim 11 further comprising changing a direction of the light ray by an arrangement of shaping optics residing between the illumination source and the micro mirror.

14. A system for reducing optical aberrations in short depth projection, the system comprising:
   an oscillating micro mirror configured to oscillate about a pivot point, and
      receive a ray of light originating from an illumination source in communication with a micro electromechanical system (MEMS) scanner;
   a layer of piezo-electric material coupled to the micro mirror, wherein the layer of piezo-electric material is configured to produce an electrical signal responsive to a first force produced by bending of the micro mirror; and
   an electro-mechanical circuit in communication with the layer of piezo-electric material,
      wherein the electro-mechanical circuit is configured to convert the electrical signal to produce a second force in an opposite direction to the first force.

15. The system of claim 14 wherein, the illumination source is a source of laser.

16. The system of claim 14, wherein the oscillating micro mirror is reinforced by reinforcing ribs made from the high stiffness material.

17. The system of claim 14, wherein the oscillating micro mirror is reinforced by one or more layers of the high stiffness material coupled to the micro mirror in an arrangement of a plurality of polygonal units.

18. The system of claim 14, wherein the oscillating micro mirror is reinforced by one or more corrugated layers of the high stiffness material coupled to the micro mirror.

19. The system of claim 14, wherein the oscillating micro mirror is reinforced by one or more layers of the high stiffness material coupled to the micro mirror in an arrangement of a plurality of lattice structures.

20. The system of claim 14 further comprising an arrangement of shaping optics, wherein the arrangement of shaping optics is configured to enable traversal by the ray of light.

* * * * *

UNITED STATES PATENT AND TRADEMARK OFFICE
CERTIFICATE OF CORRECTION

PATENT NO. : 8,416,482 B2  Page 1 of 1
APPLICATION NO. : 12/933259
DATED : April 9, 2013
INVENTOR(S) : Shahyaan Desai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this

First Day of September, 2015

Michelle K. Lee
*Director of the United States Patent and Trademark Office*